April 1, 1941.　　　　　J. R. NEIL　　　　　2,236,692
APPARATUS FOR PRODUCING SUGAR-IMPREGNATED FRUIT PRODUCTS
Filed Jan. 3, 1939　　　　2 Sheets-Sheet 2
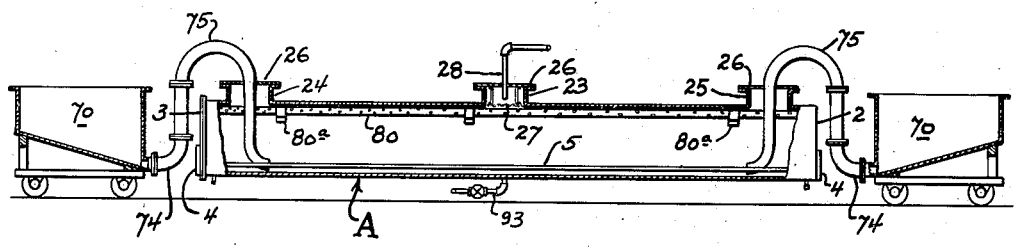
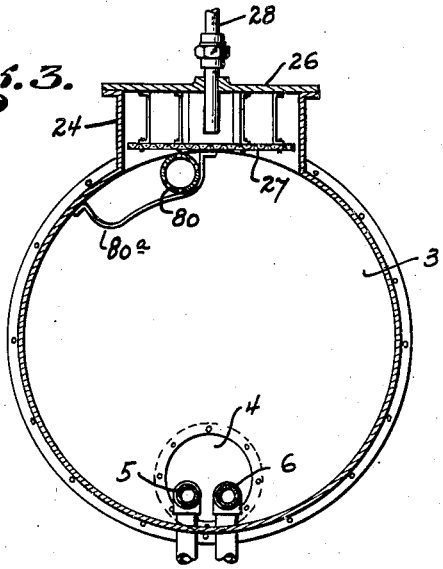
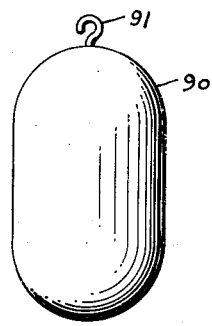
INVENTOR.
Jesse R. Neil.
BY
Chas. E. Townsend.
ATTORNEY.

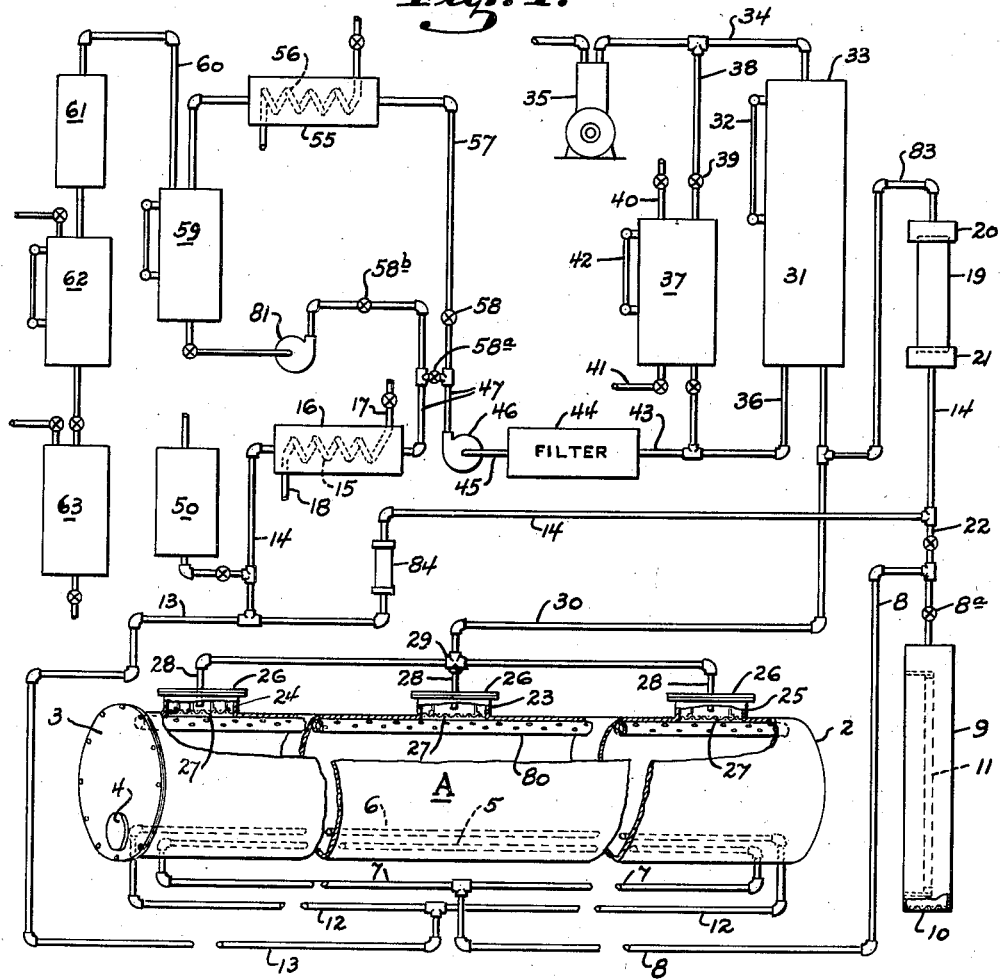

Patented Apr. 1, 1941

2,236,692

UNITED STATES PATENT OFFICE 2,236,692

APPARATUS FOR PRODUCING SUGAR-IMPREGNATED FRUIT PRODUCTS

Jesse R. Neil, Los Gatos, Calif.

Application January 3, 1939, Serial No. 249,051

7 Claims. (Cl. 99—239)

This invention relates to apparatus for producing sugar-impregnated fruit products.

The object of the present invention is to provide apparatus whereby any material such as fruit, berries, citrus peel and the like, may be impregnated to any desired degree with sugar in the form of a syrup solution; to provide an apparatus embodying a container to receive the material, means for maintaining a partial vacuum therein, together with means for maintaining a controlled circulation of syrup through the container and the material placed therein; to provide means for controlling the temperature of the syrup as circulation continues; to provide means for regenerating the syrup, or, in other words, removing water liberated by the material as the sugar content increases; and further, to provide means for introducing air at timed intervals into the container to break up material which tends to gather or pack within certain portions of the container, and thereby insure better distribution and uniform circulation of the syrup throughout the entire body of the material.

The invention is shown by way of illustration in the accompanying drawings, in which—

Fig. 1 is a diagrammatic view of an apparatus embodying my invention;

Fig. 2 is a side elevation of the main container, showing the manner in which material to be treated may be introduced or removed therefrom;

Fig. 3 is an enlarged cross-sectional view of the main container; and

Fig. 4 is a front elevation of a device which may be employed for reducing the capacity of the main container.

Referring to the drawings in detail, and particularly to Fig. 1, A indicates an elongated, cylindrically shaped container, the ends of which are closed by head members 2 and 3. Hand holes such as indicated at 4 may be provided in one or both of the heads 2 and 3 to permit convenient access to the interior of the container.

Extending along the bottom of the cylinder or container are two perforated pipes 5 and 6. The pipe 5 is connected at opposite ends by means of a pipe 7, and this is in turn connected midway of its length with a pipe 8, which in turn is connected with an air purifier generally indicated at 9. This air purifier consists of a cylindrical container on the bottom of which are mounted filter discs 10 through which air is adapted to pass, and whereby dust and similar impurities are removed. Within the container is a violet-ray lamp 11 which is provided for the purpose of sterilizing the air. In the pipe 8 is mounted a valve 8a intended to be opened intermittently. Conventional operating mechanism, not shown, may be employed if desired to effect intermittent opening of the valve 8a at suitably timed intervals.

The pipe 6 is a syrup inlet pipe and communicates at its ends with a pipe 12. The pipe 12 is in turn connected midway of its length with a pipe 13, and this is connected with a pipe 14, one end of which is connected with a heat exchange coil 15 mounted within a cylinder 16 through which any suitable heating or cooling medium may be circulated through pipe connections 17 and 18. The opposite end of the pipe 14 is conncted with an inspection chamber 19. This chamber may comprise a cylindrical elongated glass tube, the opposite ends of which are closed by head members 20 and 21. The pipe 14 is connected with the lower head member, and a pipe 22 which forms a branch of the air pipe 8 connects with the pipe 14 before it enters the inspection chamber.

The cylindrical container A is provided with three dome-like extensions, one in the center as shown at 23, and one adjacent each end, as shown at 24 and 25. Each dome-like extension is provided with a removable head member 26, and the lower end of each dome-like extension is provided with a screen bottom 27 supported by the head 26 to function as a strainer to prevent material placed within the container A from entering the dome. The syrup which enters the domes is removed through pipes indicated at 28, which extend, one through each of the dome heads 26 and downwardly toward the screens 23, terminating a short distance above the screens. The pipes 28 are connected through a cross-fitting 29 with a pipe 30, which in turn is connected with an air separating tank 31. This tank is provided with a gauge-glass 32 so that the liquid level therein may be observed. The upper end of the tank is closed by a head 33 and is connected through a pipe 34 with a vacuum pump 35 which is in continuous operation when material is being treated. The pipe 30 forms an intake for the tank, while the pipe indicated at 36 forms an outlet for liquid. This pipe 36 is connected with a second tank 37 which is provided for the purpose of removal or addition of syrup to the circuit. Tank 37 is also connected with the vacuum pump 35 through a pipe 38, and a valve 39 is mounted in said pipe to close the connection with the vacuum pump whenever required. A pipe 40 is connected with the tank to supply syrup whenever needed, and a drain pipe 41 is provided to permit draining off of syrup. Both the pipe 40 and the pipe 41 are provided with valves as shown, which are normally closed, and a gauge-glass is mounted on the side of the tank as at 42 to indicate the level of the syrup content. Pipe 36 which connects the tanks 31 and 37 is connected through a pipe 43 with the intake end of a filter 44 of any suitable construction. The outlet end of the filter is connected through a pipe 45 with the intake side of a circulating pump 46, and the discharge side thereof is connected through a pipe 47 with the inlet end of the heat exchange coil 15. The discharge side of the heat exchange coil connects with pipe 14, and it also connects with a tank 50 adapted to contain a heavy syrup solution for fortifying purposes, as will hereinafter be described.

Fruits when treated with a syrup solution give off water, which tends to dilute or exhaust the syrup solution. It is essential that this water be removed from the circulating syrup, and an evaporator has been provided for this purpose. The evaporator consists of a tank 55 through which passes a steam or similar heating coil 56, connected with a source of supply not shown. One end of the evaporator is connected through a pipe 57 with the discharge side of the pump 46. A valve 58 is mounted in this pipe, and will under normal conditions be slightly open, so that a small proportion of the total quantity of syrup circulated by the pump 46 will be by-passed through the pipe 57 and the evaporator. The evaporator raises the temperature of the syrup solution sufficiently to liberate a portion of its water content. The heated syrup solution discharges from the evaporator into a syrup-receiving tank 59. The steam liberated leaves the tank through a pipe 60, and is condensed to a suitable condenser 61. Below or adjacent the condenser is a water- or condensate-receiving tank 62, and below or adjacent the latter is a drain tank 63, from which the condensate may be intermittently drained. The condenser 61 may be of any conventional type.

The manner in which the fruit to be treated is introduced into or removed from the container A is important, as breakage or bruising should be maintained at a minimum. To eliminate breakage and insure careful handling of the material, portable tanks 70 as shown in Fig. 2 are employed. Each tank 70 is filled with fruit and syrup. The bottoms of the tanks 70 are inclined, as shown, and a rubber outlet pipe 74 is provided. These outlets are connected with pipe bends 75 having curves of as large a sweep as possible. These pipes extend through the cover plates 26 of the domes to a point adjacent the bottom of the tank A.

After the portable containers have been connected as shown in Fig. 2, the lower portion of the tank is filled with syrup, for instance to a level of three inches or more, to facilitate movement of the first fruit and syrup as it enters through the pipe 75. In order to introduce the material a vacuum is applied to the tank by starting the pump 35, which is connected through tank 31 and the pipe 28 with the container A. As the vacuum increases, the material together with the syrup solution containing the same will be drawn through the pipes into the tank until it is substantially filled, after which the pipes 75 are disconnected, the heads 26 closed, and the pipes 28 connected. The pump 46 is now started, and the syrup content in the tank 31; the filter 44 and the heat exchanger 15 will enter through the pipes 14, 13, and 12 into opposite ends of the perforated pipe 6. Syrup will thus circulate upwardly through the fruit or material being treated, and will rise into the domes 23, 24 and 25, where it will be continuously removed through the pipe 28, which returns the syrup to the tank 31. This tank is, however, directly connected with the filter 44 and the circulating pump 46, and it will thus be continuously circulated through the pump, the filter, the heater and the tanks A and 31.

In operation it has been found that the fruit or other material being treated is buoyant, so tends to rise, gather, and pack at the top of the tank, and this would tend to clog the screens and stop circulation. To avoid this a perforated pipe 80 may be extended from end to end of the cylinder A directly below the screens. This pipe prevents clogging directly under the screens at the bottom of the domes, and provides a large entrance area of the syrup solution, which in turn passes from the pipe through the screens into the domes. The pipe 80 is preferably supported, as shown in Fig. 3, by brackets 80a which are of a shape to permit the pipe to be moved to one side and out of line with the domes 23, 24 and 25 for facilitating access to the interior of the tank through said domes. There is a tendency for the material to gather around the pipe 80, and to some extent around the screens at the bottom of the domes. To minimize this tendency to gather and to cause agitation of the syrup between the pieces of fruit, air is introduced at timed intervals through the perforated pipe 5 by the valve 8a. The air is sterilized due to its exposure to the ultraviolet rays, and foreign material is removed by the filter 10. These surges of air agitate the material and insure a uniform circulation of the syrup solution through the body of the material. The air thus introduced escapes through the pipes 28, enters the tank 31, and rises to the upper end thereof, from which it is removed by the pump 35.

As previously stated, water is liberated by the material and the syrup becomes diluted as the process is carried on. The evaporator 55 insures continuous removal of water from the syrup. The quantity of syrup solution by-passed through the evaporator and the pressure in the evaporator system are partially controlled by adjustment of the valves shown at 58, 58a and 58b. It is desirable that the evaporator system be operated at a somewhat lower vacuum than the main circulating system so that higher temperatures will be employed in the evaporating process and the sterilizing effect of the evaporating heat may be utilized. Under normal operating conditions there will be continuous circulation through the evaporator. The syrup solution thus relieved of water, or regenerated, is collected in the tank 59 and is returned to the circulating system by means of a pump indicated at 31. The condensate removed by the evaporator is condensed in the condenser 61 and collected in the tanks 62 and 63.

Referring again to Fig. 1, the observation chamber 19 shown therein is filled with the same material as that with which the cylinder or chamber A is to be charged. Syrup and air are circulated therethrough as the lower head 21 is connected with the syrup supply pipe 14 and with the air supply line 8 through the branch pipe 22. As this observation chamber is formed of a transparent glass tube, the entire process may be under continuous observation. Glass sections such as shown at 84 may be positioned wherever desired in the syrup circulating circuit, and the flow, condition and circulation of the syrup may thus also be maintained under continuous observation.

Subjecting the fruit to vacuum makes it more receptive to the sugar with which it is impregnated. Different varieties of fruit vary in their resistance to vacuum and some when subjected to too great a vacuum develop permanent unsightly gas pockets which appear as small bubbles, or have their tissue structure damaged. The range of 10 to 24 inches of vacuum during processing provides adequate flexibility to avoid any such undesirable effects and still obtain the maximum advantage in the use of the vacuum.

The temperature maintained in the syrup through the operation ranges from 50° to 115° F. During approximately the first quarter of the period of operation, the temperature is maintained between 50° and 60° F.; thereafter the temperature is increased to between 105° and 115° F. The initial low-temperature period serves to insure firming up of the fruit tissue. Fruit tissue subjected to a period of coldness develops a firm body that will withstand more subsequent heating without breaking down than it otherwise would. The temperature ranges used inhibit fermentation.

The sugar concentration in the syrup may be increased gradually or by steps during impregnation. The average rate of rise of the sugar concentration of the syrup ranges between 0.4° and 1.0° Brix per hour, depending upon the thickness of the pieces of fruit being treated and their specific characteristics. Basically the speed of absorption of sugar by the fruit tissue is limited by its tendency simultaneously to release water at an even greater speed. By using adequate time, a condition near equilibrium prevails, whereby the fruit holds its weight, or nearly so. The system of slowly fortifying or strengthening the impregnating syrup as the sugar is absorbed from it by the fruit results in a low operating sugar concentration differential between syrup and fruit. Buoyancy of the fruit and its effects are consequently at a minimum.

It is desirable in treating citrus peel that it be given its usual leaching treatment before impregnation with the syrup solution. Fresh fruits should be cooked in a syrup solution of nearly the same sugar concentration as that of the juice of the fruit. After cooking, the fruit should be allowed to cool in the same syrup solution, and placed, together with the solution, in the portable tanks 70 and 71.

The syrup used in the process may vary with different products being treated, but a typical example that is satisfactory for most purposes consists of one-half corn syrup and one-half cane or beet sugar. About one per cent of citric acid is employed. The corn syrup prevents crystallization and reduces sweetness, and the citric acid provides tartness of flavor in the product, aids in inhibiting fermentation, and also improves the color of the treated fruit.

Processing of the fruit material being treated is stopped when a desired sugar concentration in the fruit tissue is reached. For example, impregnation which requires 2½ to 6 days is carried to 70.0 Brix for glazed type fruits. A similar candied product can be produced by impregnation to a fraction of this extent. Dehydration of the product is optional.

If at any time during the operation of the process fermentation should develop, sterilization can be effected by raising the temperature in the heat exchanger 15.

As the process progresses and the syrup strength is to be increased, a valve between the tank 50 and pipe 14 is opened, and heavy syrup may be introduced into the circulating system as desired. Syrup may also be introduced from the tank 37, or removed from time to time as has been described.

When the process is completed, the material is removed from the container A by the portable containers 70 and 71, which are positioned as shown in Fig. 2, while pressure from a suitable source is introduced into the tank A. Any syrup or material left in the bottom of the container can be removed through the flushing opening 4.

The process as described above is carried out most efficiently when the tank A is completely filled with fruit and syrup; consequently, if it is desired to treat less than a full batch of fruit the capacity of the tank should be reduced. In order that the capacity of the tank may be conveniently reduced, I have provided space-consuming bulbs of the form shown at 90 in Fig. 4, which bulbs may be of hollow, metal can-like construction and of any material impervious to syrup. These bulbs are preferably provided with small eyes as indicated at 91 so that they may be suspended within the tank A on a suitable line arranged longitudinally of the tank for that purpose. The bulbs are of a size to permit their insertion through the head members of the tank when the longitudinally-extending pipe 80 has been moved to one side in its bracket 80a.

The use of these space-consuming bulbs is also of importance in treating a full tank of fruit which may shrink or pack during treatment. As the volume of the fruit decreases the quantity of syrup needed to maintain the tank full increases. Efficiency in operation and a saving of syrup used may be effected by inserting the space-consuming bulbs during the process as the volume of the fruit decreases.

In order that syrup may be drained from the tank conveniently, I provide, as shown in Fig. 2, a valve outlet pipe 93 which is provided with a strainer at its inner end, preferably in the form of an elongated, perforated pipe similar to the pipe 80 but disposed horizontally along the bottom wall of the tank A.

While the invention has been described as employing a single container in which the fruit is treated it should be understood that a plurality of containers may be used if desired. Various other features of the invention have been described more or less specifically for purposes of illlustration, but it is to be understood that the construction and arrangement of the various parts of the apparatus herein shown may be varied within the scope of the appended claims.

Having thus described my invention, what I claim is:

1. An apparatus for producing sugar-impregnated fruit products and like materials, comprising a container to receive the fruit, an inlet and an outlet on the container, a pump connected therewith to maintain controlled circulation of a syrup solution through the container, a heat exchanger through which the syrup solution is also circulated, means for maintaining a partial vacuum in the container, a perforated air inlet pipe in the container, and an intermittently operated valve in the pipe to permit surges of air to enter and pass through the syrup solution and between the pieces of fruit in the container.

2. An apparatus for producing sugar-impregnated fruit products and like materials, comprising a container to receive the fruit, an inlet and an outlet on the container, a pump connected therewith to maintain controlled circulation of a syrup solution through the container, a heat exchanger through which the syrup solution is also circulated, means for maintaining a partial vacuum in the container, a perforated air inlet pipe in the container, an intermittently operated valve in the pipe to permit surges of air to enter and pass through the syrup solution and between the pieces of fruit in the container, and means for sterilizing and filtering the air prior to passage through the container.

3. An apparatus for producing sugar-impregnated fruit products and the like which comprises an elongated, horizontally-disposed tubular container for fruit to be treated, means for maintaining a controlled circulation of a syrup solution through the container, and means for admitting air intermittently to pass through the container with the syrup.

4. An apparatus for producing sugar-impregnated fruit products and the like which comprises an elongated, horizontally-disposed tubular container for fruit to be treated, means for maintaining a controlled circulation of a syrup solution through the container, means for maintaining a partial vacuum within the container during the circulation of syrup therethrough, and means for admitting air intermittently to pass through the container with the syrup.

5. An apparatus for producing sugar impregnated fruit products and the like which includes a treating chamber in the form of an elongated horizontally disposed tube, means for admitting syrup adjacent the bottom of the chamber and withdrawing it from the top, and means for admitting a controlled quantity of air to pass through the chamber with the syrup.

6. An apparatus for producing sugar-impregnated fruit products and like materials, comprising a container to receive the fruit, an inlet and spaced outlets on the container, a pump connected therewith to maintain controlled circulation of a syrup solution through the container, a heat exchanger through which the syrup solution is also circulated, means for maintaining a partial vacuum in the container, a perforated air inlet pipe in the container, an intermittently operated valve in the pipe to permit surges of air to enter and pass through the syrup solution and between the pieces of fruit in the container, screens covering said spaced outlets, a tubular barrier below the screen having a plurality of apertures disposed longitudinally of the tube and through which liquid may percolate, and brackets arranged to hold said tube and to permit movement of said tube away from said outlets to provide access therethrough to said container.

7. An apparatus for producing sugar-impregnated fruit products and the like, which comprises an elongated, horizontally disposed, tubular container for fruit to be treated, means for permitting circulation of a syrup solution through said container comprising inlet ports disposed at the bottom of said container, outlet ports disposed at the top of said container, an apertured tube of a size sufficient to prevent massing of said fruit products against said outlet ports while freely permitting passage of said syrup solution, supporting means arranged to hold said tube immediately beneath said outlet ports and to permit movement of said tube to a position not blocking ingress to said container through said ports, means for producing circulation of said solution through said container, and means for admitting air intermittently to pass through the container with the syrup.

JESSE R. NEIL.